US 8,956,567 B2

(12) United States Patent  
Lou et al.

(10) Patent No.: US 8,956,567 B2  
(45) Date of Patent: Feb. 17, 2015

(54) CONTROL AND OPTIMIZATION SYSTEM AND METHOD FOR CHEMICAL LOOPING PROCESSES

(71) Applicant: ALSTOM Technology Ltd, Baden (CH)

(72) Inventors: Xinsheng Lou, West Hartford, CT (US); Abhinaya Joshi, Manchester, CT (US); Hao Lei, Windsor, CT (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/275,201

(22) Filed: May 12, 2014

(65) Prior Publication Data

US 2014/0249678 A1 Sep. 4, 2014

Related U.S. Application Data

(62) Division of application No. 13/014,776, filed on Jan. 27, 2011, now Pat. No. 8,761,943.

(60) Provisional application No. 61/299,590, filed on Jan. 29, 2010.

(51) Int. Cl.  
*G01B 21/00* (2006.01)  
*F23N 5/00* (2006.01)  
(Continued)

(52) U.S. Cl.  
CPC ... *F23N 5/00* (2013.01); *C10J 3/72* (2013.01); *C10J 3/723* (2013.01); *C10J 3/725* (2013.01);  
(Continued)

(58) Field of Classification Search  
CPC .............. B01J 2208/0061; B01J 2219/00164; B01J 8/00; F23C 10/04; F23C 6/04; F23C 10/32; F23C 9/00; F23C 2900/99008; F23N 5/184; G05B 13/0285; C10J 3/72; C10J 3/723; C10J 3/725; C10J 2300/0996; C10J 2300/1807; Y02E 60/36

USPC .................. 700/266, 274; 435/3, 286.1, 812; 436/55; 702/22–25, 30, 31, 32, 109; 422/62, 105, 110, 111

See application file for complete search history.

(56) References Cited

U.S. PATENT DOCUMENTS

| 4,354,468 A | 10/1982 | Sone et al. |
| 7,083,658 B2 | 8/2006 | Andrus, Jr. et al. |

(Continued)

FOREIGN PATENT DOCUMENTS

| JP | H0791612 A | 4/1995 |
| JP | 2001-234204 A | 8/2001 |
| WO | 2008/027246 A2 | 3/2008 |

OTHER PUBLICATIONS

Maley, et al., "Plant Process Control Workshop—Summary Report", U.S. Department of Energy, National Energy Technology Laboratory, Jun. 2006, pp. 1-16 and pp. 54-57.

(Continued)

*Primary Examiner* — Shogo Sasaki  
(74) *Attorney, Agent, or Firm* — Robert D. Crawford

(57) ABSTRACT

A control system for optimizing a chemical loop system includes one or more sensors for measuring one or more parameters in a chemical loop. The sensors are disposed on or in a conduit positioned in the chemical loop. The sensors generate one or more data signals representative of an amount of solids in the conduit. The control system includes a data acquisition system in communication with the sensors and a controller in communication with the data acquisition system. The data acquisition system receives the data signals and the controller generates the control signals. The controller is in communication with one or more valves positioned in the chemical loop. The valves are configured to regulate a flow of the solids through the chemical loop.

17 Claims, 2 Drawing Sheets

(51) Int. Cl.
*C10J 3/72* (2006.01)
*F23C 99/00* (2006.01)
*F23N 5/18* (2006.01)
*G05B 13/02* (2006.01)

(52) U.S. Cl.
CPC ............... *F23C 99/00* (2013.01); *F23N 5/184* (2013.01); *G05B 13/0285* (2013.01); *F23C 2900/99008* (2013.01); *C10J 2300/0996* (2013.01); *C10J 2300/1807* (2013.01); *Y02E 60/36* (2013.01); *Y02E 20/346* (2013.01); *Y10S 435/812* (2013.01)
USPC ............... 422/62; 700/266; 700/274; 702/22; 702/23; 702/24; 702/25; 702/30; 702/31; 702/32; 702/109; 422/105; 422/110; 422/111; 436/55; 435/3; 435/286.1; 435/812

(56) References Cited

U.S. PATENT DOCUMENTS

| 7,533,620 | B2 | 5/2009 | Morin et al. |
| 2004/0237404 | A1 | 12/2004 | Andrus, Jr. et al. |
| 2007/0078533 | A1 | 4/2007 | Caldwell et al. |
| 2009/0000194 | A1 | 1/2009 | Fan et al. |
| 2009/0222108 | A1 | 9/2009 | Lou et al. |

OTHER PUBLICATIONS

Decision of Refusal—Japanese Appl. No. 2012-551310, dated May 7, 2014.

US 8,956,567 B2

CONTROL AND OPTIMIZATION SYSTEM AND METHOD FOR CHEMICAL LOOPING PROCESSES

CROSS-REFERENCE TO RELATED APPLICATIONS

This patent application claims priority to and is a divisional of U.S. Ser. No. 13/014,776, filed Jan. 27, 2011, entitled CONTROL AND OPTIMIZATION SYSTEM AND METHOD FOR CHEMICAL LOOPING PROCESSES, now U.S. Pat. No. 8,761,943, which in turn claims priority to U.S. Provisional Application No. 61/299,590, filed Jan. 29, 2010, which are both herein incorporated by reference in their entireties.

GOVERNMENT LICENSE RIGHTS

This invention was made with government support under Contract DE-FC26-07NT43095 awarded by the U.S. Department of Energy. The government has certain rights in the invention.

TECHNICAL FIELD

The present disclosure relates generally to systems and methods for control and optimization of power generation and gasification processes and, more specifically, to systems and methods for control and optimization of chemical looping processes employed within power generation and gasification plants.

BACKGROUND OF THE INVENTION

Chemical loops (CL) can be utilized in power generation plants (e.g., electricity or steam generation plants) which burn fuels such as, for example, coal, petroleum, biofuel, biomass, and other fuels. A typical system employing CL utilizes a high temperature process in which solids such as, for example, calcium-based or metal-based compounds, are "looped" between a first reactor, referred to as an oxidizer, and a second reactor, referred to as a reducer. In an oxidation reaction occurring in the oxidizer, oxygen from air injected into the oxidizer is captured by solids introduced to the oxidizer. The captured oxygen is then carried by the oxidized solids to the reducer where the oxygen is used for combustion and/or gasification of one of the aforementioned fuels such as, for example, coal. After a reduction reaction in the reducer, the solids release the captured oxygen and are returned to the oxidizer to be oxidized again, thus forming the loop and repeating the cycle.

In many generation systems, multiple CL loops interact. Control and optimization of CL processes and multiple-loop CL processes, in particular, can be complex. Not only does the transport of the solids complicate control and optimization, but the chemical and thermal reactions introduce variables such as, for example, time delay due to transport of the solids and chemical reaction rates in the combustion and gasification processes, which is generally accounted for in the control and optimization system.

SUMMARY

According to aspects illustrated herein, there is provided a control system for optimizing a chemical loop system that includes one or more sensors for measuring one or more parameters in a chemical loop. The sensors are disposed on a conduit positioned in the chemical loop. The sensors generate one or more data signals representative of an amount of solids in the conduit. The control system includes a data acquisition system in communication with the sensors. The control system also includes a controller, such as, but not limited to a computer, in communication with the data acquisition system. The data acquisition system receives the data signals and the controller generates the control signals. The controller is in communication with one or more valves positioned in the chemical loop. The valve is configured to regulate a flow of the solids through the chemical loop.

According to other aspects disclosed herein, the data signal is representative of a height, volume and/or mass of the solids in the conduit.

According to other aspects disclosed herein, the data signal is representative of a differential pressure measured across a portion of the chemical loop, a mass flow rate in a portion of the chemical loop, and/or air flow rate in a portion of the chemical loop.

According to other aspects disclosed herein, the conduit on which the sensor is positioned is substantially vertical and is positioned between and in fluid communication with a separator and another valve. Both the separator and the other valve are positioned in the conduit. The separator is disposed in the chemical loop downstream of at least one of an oxidizer and a reducer.

According to other aspects disclosed herein, the chemical loop system includes a first chemical loop in fluid communication with a second chemical loop. One or more of the control signals is in communication with one or more first valves positioned in the first chemical loop and one or more second valves positioned in the second chemical loop. The second valves are configured to regulate a flow of solids through the second chemical loop and/or between the first and second chemical loops.

According to other aspects disclosed herein, there is disclosed a method for controlling and optimizing a chemical loop. An oxidizer having a first conduit in fluid communication with an interior area of the oxidizer is provided. A separator, in fluid communication with the first conduit and having a second conduit coupled thereto, is also provided. A portion of the second conduit is positioned substantially vertically. A control valve is positioned in the second conduit and one or more sensors are positioned in the substantially vertical portion of the second conduit, between the separator and the control valve. A control system is also provided. The sensors are in communication with the control system. The sensors generate one or more data signals representative of an amount of solids in the second conduit. The data signals are received by the control system. The control valve is controlled with the control signals to regulate flow of the solids through the chemical loop.

BRIEF DESCRIPTION OF THE DRAWINGS

Referring now to the Figures, which are exemplary embodiments, and wherein the like elements are numbered alike.

DETAILED DESCRIPTION OF PREFERRED EMBODIMENTS

Disclosed herein is a control and optimization system for a chemical looping system having one or more chemical loops (CL) employed within, for example, power generation plants and/or gasification plants. The control and optimization system measures plant and process parameters such as, for example, temperature, pressure, mass flow rate, levels and volumes of masses within the system, reaction time, and the like, at one or more points in the system and in order to maintain desired operating conditions, adjusts valve positions, flow and/or volume in response thereto.

Figure 1:
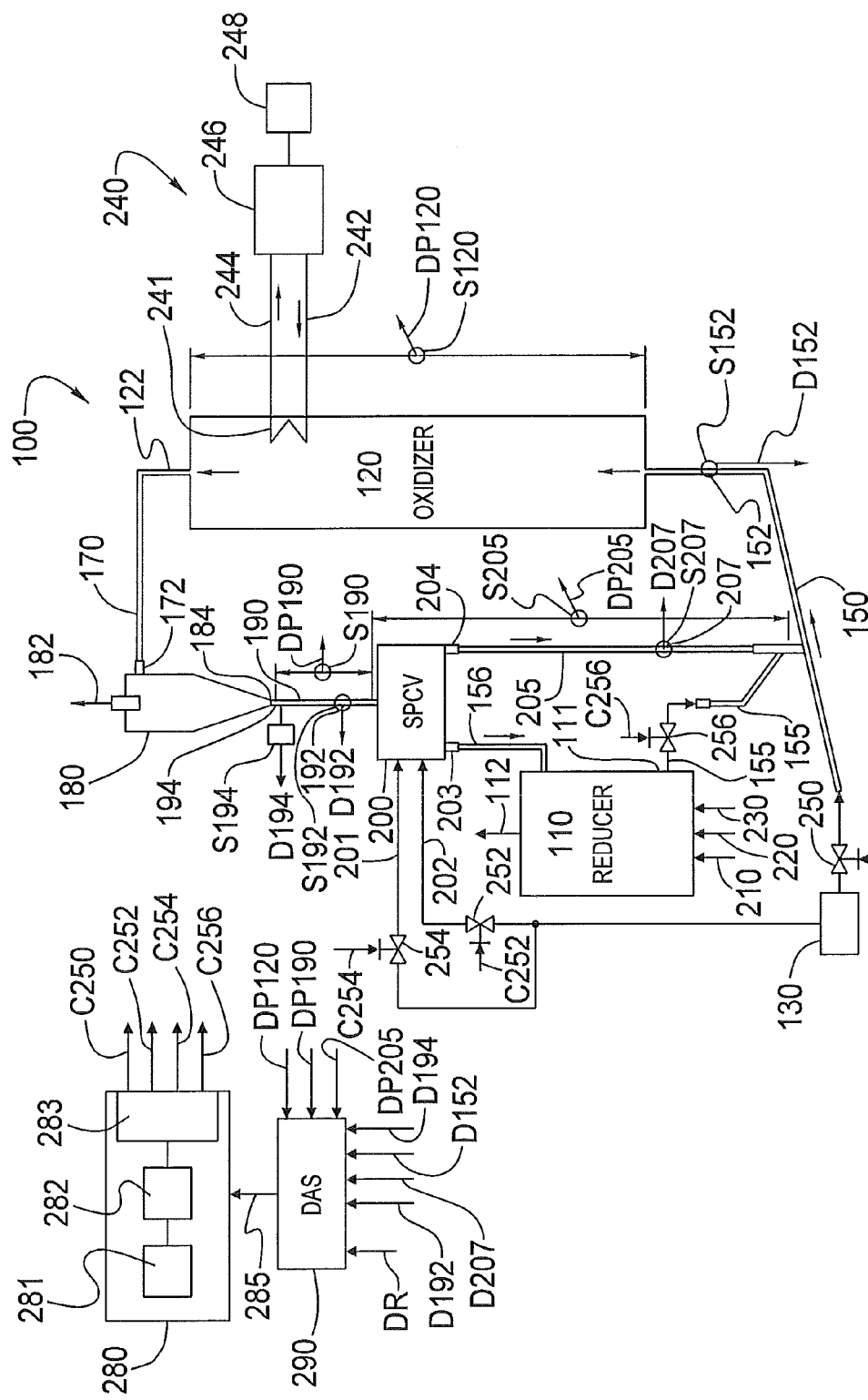
FIG. 1 is a simplified block diagram of a CL system of a power generation plant.

FIG. 1 illustrates a single-loop CL system, generally designated by the numeral 100, for use in a power generation process. As shown in FIG. 1, the CL system 100 includes a reducer 110 (i.e., a reducing reactor), which can effect reduction reactions, and an oxidizer 120 (i.e., an oxidizing reactor), which can effect oxidation reactions. Suitable reactors include, for example, transport reactors and fluidized bed reactors. The reducer 110 and the oxidizer 120 are in fluid communication with one another, as described below. The reducer includes an outlet 112 for removal of a gas generated in the reducer. In one embodiment, the CL system 100 is similar to that described in commonly-owned, U.S. Pat. No. 7,083,658, the disclosure of which is incorporated herein by reference. While the CL system is described for use in a power generation process, other applications are also contemplated including but not limited to gasification processes such as, but not limited to, those used to produce syngas and those used to sequester carbon dioxide.

As shown in FIG. 1, an air supply 130 is in fluid communication with an interior area of the oxidizer 120, via a conduit 150 extending therebetween. A control valve 250 is positioned in the conduit 150, downstream of the air supply 130, for regulating air flow discharged into the conduit 150. In one embodiment, the conduit 150 is positioned generally below the oxidizer and/or the reducer 110. An outlet 122 of the oxidizer 120 is in fluid communication with an inlet 172 of a separator 180, for example a cyclone. The separator 180 includes a gas outlet 182, for example, a vent positioned on a generally upper portion of the separator. In addition, the separator 180 includes another outlet 184, for example a pipe positioned on an end of the separator, substantially opposite the gas outlet 182. The other outlet 184 of the separator 180 is in fluid communication with a control valve 200, for example a sealed pot control valve (SPCV), via a conduit 190. In one embodiment, the conduit 190 is substantially vertical.

Still referring to FIG. 1, the SPCV 200 defines two outlets 203 and 204. One of the outlets 203 is connected to the reducer 110 by a conduit 156, thereby providing fluid communication between the SPCV 200 and an interior area of the reducer 110. The other outlet 204 of the SPCV 200 is connected to another conduit 205 which is in fluid communication with the conduit 150. The SPCV 200 is also in fluid communication with two air supply lines 201 and 202 which are in fluid communication with the air supply 130. The air supply line 201 includes a control valve 254 positioned therein and the air supply line 202 includes another control valve 252 positioned therein. Each of the control valves 252 and 254 regulate air flow into the SPCV 200, as described below.

As shown in FIG. 1, the interior area of the reducer 110 is in fluid communication with: 1) a fuel source (not shown), for example a pulverized coal supply, via an inlet 210; 2) a source of limestone and/or calcium carbonate ($CaCO_3$) (not shown), via another inlet 220; and 3) a steam supply (not shown) via yet another inlet 230. The reducer 110 also includes an outlet 111 which is in fluid communication with an inlet of a control valve 256 via a conduit 155. An outlet of the control valve 256 is in fluid communication with the conduit 205, via the conduit 155.

The CL system 100 includes a plurality of sensors positioned throughout the CL system each of which generates one or more data signals. The sensors and data signals, include but are not limited to: 1) a differential pressure sensor S120 for measuring differential pressure across the oxidizer 120 and generating data signal DP120; 2) a differential pressure sensor S190 for measuring differential pressure across the conduit 190 and generating data signal DP 190; 3) a differential pressure sensor S205 for measuring differential pressure across the conduit 205 and generating data signal DP205; 4) a mass level, mass flow rate and/or air flow rate sensor S152 positioned at a point 152 in the conduit 150 and generating data signal D152; 5) a mass level, mass flow rate and/or air flow rate sensor S192 positioned at a point 192 in the conduit 190 and generating a data signal D192; 6) a mass level, mass flow rate and/or air flow rate sensor S207 positioned at and a point 207 in the conduit 205 and generating a data signal D207; and 7) a mass, volume and/or level sensor S194 measured at a point 194 in the conduit 190 and generating a data signal D194.

In addition, the data signals include predetermined data signals DR generated in an external sources (not shown), for example, a computer. The predetermined data signals DR include but are not limited to regulatory controls, load change limitations and/or plant shut-down and start up characteristics. While the mass level, mass flow rate, air flow rate, and mass volume are described and shown as being measured at points 152, 192, 194 and 207, it is contemplated that the mass level, mass flow rate, air flow rate, and mass volume can also be measured at a plurality of points, without departing from the broader aspects disclosed herein. Moreover the sensors S120, S190, S205, S152, S192, S207 and S194 can be positioned on an exterior or interior surface of or in an interior area of the conduits, reducer, oxidizer or separator, or be in fluid communication therewith.

In one embodiment, 1) the term mass level refers to the extent to which the solids fill a particular conduit, for example the height of the solids in the conduit 190 or the amount of solids present in a particular cross section of a conduit, at a point or points in time and 2) the term mass volume refers to the amount of solids present in a conduit or portion of the conduit, relative to the maximum capacity thereof, for example expressed in units of mass such as kilograms and/or a fraction or percentage, at a point or points in time. Various technologies for measuring mass level and mass volume of the solids can be employed including but not limited to ultrasonic sensors, acoustic wave sensors, laser sensors, capacitance sensors and combinations thereof. The sensors can be mounted on, within or in operable proximity to the respective conduits.

Referring to FIG. 1, a control system 280 is shown in communication with a data acquisition system (DAS) 290 via a communications link 285. In one embodiment, the control system 280 is a computer. The control system 280 includes an analysis module 281, a signal generator 282 and a signal transmitter 283 in communication with one another. The DAS 290 is in communication with the differential pressure sensor S120, the differential pressure sensor S190, the differential pressure sensor S205, the mass level, mass flow rate and/or air flow rate sensor S152, the mass level, mass flow rate and/or air flow rate sensor S192, the mass level, mass flow rate and/or air flow rate sensor S207, the mass volume and/or level sensor S194 and the external source, via suitable data links. Thus the DAS 290 receives the data signals DP120, DP190, DP205, D152, D192, D207, D194 and DR. The signal transmitter 283 is in communication with control valves 250, 252, 254 and 256 for transmitting control signals C250, C252, C254 and C256 to the control valves 250, 252, 254 and 256, respectively, as described below.

In one embodiment, the control system 280 includes one or more control modules such as, for example, a proportional-integral-derivative (PID) controller, a fuzzy controller, an adaptive controller, and a model-based controller. The adaptive controller may include, for example, self-tuning adaptive controls, neuro-adaptive controls, a neural network (NN) and/ or a wavelet network. As the CL system and processes employed therein involve multi-phase flows and chemical reactions, the systems are characterized by process nonlinearities and time delays due to, among other things, mass transport rates and chemical reaction rates. As a result, nonlinear control and optimization techniques are typically employed within the CL processes. In one embodiment, the control system 280 includes nonlinear dynamic CL modeling and simulation derived from, for example, first principle equations such as mass, momentum, and energy balances equations. The modeling and simulation may include, for example, one or more of the following, employed alone or in any combination, ordinary differential equations (ODEs), algebraic equations (AEs), and partial differential equations (PDEs). Additionally, empirical modeling methods, e.g., data driven models, such as the neural networks (NN), may be used in a hybrid dynamic model structure which combines simplified first-principle models with data-driven models. Further, multivariable model predictive controls (MPC) using both linear and nonlinear models provide solutions to dynamic optimization of the CL process.

As described herein, one objective of the control system 280 is to regulate the mass flow rate of solids within the CL system 100. The use of mass, flow, volume and level sensors, such as, but not limited to, the mass, volume and/or level sensor S194, provide more useful information with respect to mass flow rates within CL systems, compared to conventional control systems. For example, the volume and/or level of solids in the conduit 190 helps establish a sufficient seal pressure for the CL system Increasing the level of solids in the conduit 190, increases the seal pressure. Higher seal pressures in the CL system 100 contribute to increasing an operational range of the CL system. The level of solids in the conduit 190 can be controlled, for example, by regulating the feed of solids (e.g., the Ca) through the control valve 256. Thus measurement of the volume and/or level in the conduit 190 has utility as a parameter for use in generating control signals that regulate the position of the control valve 256 to effect changes in the operational range of the CL system 100. Moreover, fluctuations of operating parameters can be minimized by the control signals C250, C252, C254 and C256 which are based at least in part on volume and/or level in the conduit 190. For example, stability of the CL system 100 at or near the operating limits of the CL system improves the profitability of operating the CL system.

In one embodiment, the CL system 100 includes a thermal loop 240 which includes a heat exchanger 241 in communication with the oxidizer 120 for extracting heat generated therein. The thermal loop 240 includes, for example, a steam turbine 246 which drives a power generator 248 using steam 244 generated by boiling feedwater 242 with the heat produced during oxidation.

During operation, a solid such as, for example, calcium (Ca) is produced in the reducer 110 as a result of the reduction reaction. In one embodiment, the Ca is calcium sulfide (CaS). The Ca is discharged from the reducer 110 into the interior area of the oxidizer 120 via the conduits 155, 205 and 150. The Ca is oxidized in the oxidizer 120 to produce a calcium oxide (CaO). The CaO is transported through the conduit 170 to the separator 180. At the separator 180, an oxidation gas such as, for example, nitrogen gas (N2), is removed from the CaO and discharged from the separator, through the gas outlet 182. The CaO is discharged from the separator 180 into the SPCV 200 via the conduit 190. A portion of the CaO is passed from the SPCV 200 to the reducer 110 through the conduit 156. The CaO is a carrier for delivering oxygen to the reducer 110. The fuel is delivered to the reducer 110 via inlet 210 and the limestone is introduced into the reducer via inlet 220. The fuel and the limestone react with the oxygen contained in the CaO in a combustion and/or gasification reaction thereby reducing the CaO to the Ca. The Ca is then returned to the oxidizer 120 through the conduit 155 and the conduit 150 to again be oxidized into CaO in the oxidizer 120. The cycle described above repeats.

While the CL system 100 is described above as being a calcium oxide based system, it is also applicable to employ a metal oxide within the CL system 100 such as is described in, for example, commonly-owned, U.S. Pat. No. 7,533,620, which is incorporated herein by reference.

In addition, reduction in the reducer 110 also produces a gas which is removed from the reducer via the outlet 112. The gas includes, for example, a synthesis gas (syngas), hydrogen gas (H2), and/or carbon dioxide gas (CO2). The composition of the gas, e.g., proportions of the syngas, the H2, and/or the CO2 therein, varies based upon a ratio of the fuel to the air.

During operation, the control system 280 controls the transport of an amount of solids (e.g., the Ca and the CaO) within the CL system 100 based on the amount of air supplied from the air supply 130 to the conduit 150 and the amount of air supplied from the air supply 130 to the SPCV 200. For example, 1) the control valve 250 controls the amount of the air introduced into the conduit 150 which controls the amount of the solids (e.g., the Ca) transported to the oxidizer 120; 2) the control valve 252 controls then amount of air introduced into the SPCV air supply inlet 202 which controls the amount of the CaO passed from the SPCV 200 to the reducer 110; and 3) the control valve 254 controls the amount of air introduced into the SPCV air supply inlet 201 which controls the amount of the CaO passed from the SPCV to the conduit 205 (e.g., bypassing the reducer 110).

Control of the transport of the solids in the CL system 100 is based on an analysis of the data signals DP120, DP190, DP205, D152, D192, D207, D194 and DR by the analysis module 281. The data acquisition system DAS 290 collects the data signals DP 120, DP 190, DP205, D152, D192, D207, D194 and DR and transmits the data signals to the control system 280 via the data link 285. The analysis module 281 of the control system 280 analyzes and compares the data signals DP120, DP190, DP205, D152, D192, D207, D194 and DR. In addition the analysis module 281 transmits data to the signal generator 282 which generates the control signals to adjust air and solids flow and/or volume at various points within the CL system 100. The adjustment of air and/or solids flow and/or volume is based on a comparison (e.g., determining differences between) of two or more parameters measured within the system 100 (e.g., a difference in differential pressure across the conduit 190 and the oxidizer 120), and/or to meet predetermined set points and/or rule-based control and optimization decision making based on for example a predetermined mass level in the conduit 190.

For example, based on the data signals DP120, DP190, DP205, D152, D192, D207, D194 and DR, the signal generator 282 generates and the transmitter 283 transmits the control signals C250, C252 and C254 to the control valves 250, 252 and 254, respectively, to adjust air flow from the air supply 130 through the control valves 250, 252 and 254, respectively. The control valve 256 controls the amount of solids (e.g., the Ca) from the reducer 110 that is returned to the oxidizer 120 through the conduit 150. The control valve 256 responds to the control signal C256 from the control system 280.

While FIG. 1 illustrates a single loop CL system 100, the control and optimization systems and methods as described herein are not limited in this regard. For example, use of CLs is contemplated in multiple loops including but not limited to a two-loop CL system 300 as shown if FIG. 2, including a first chemical loop 300A and a second chemical loop 300B and other multiple loop CL's such as those with steam activation and/or calcinations and the multiple loop CLs as described in commonly owned, U.S. Pat. No. 7,083,658.

In the first chemical loop 300A, an air supply 302A is shown in fluid communication with a reducer 310A, via a conduit 305A. A control valve 350A is positioned in the conduit 305A, downstream of the air supply 302A, for regulating air flow discharged into the conduit 305A. In one embodiment, the conduit 305A is positioned generally below the reducer 310A. The reducer 310A is in fluid communication with a separator 320A, via a conduit 315A. The separator 320A is in fluid communication with a SPCV 330A, via a conduit 325A. The SPCV 320A includes two outlets, 332A and 334A. The outlet 332A of the SPCV 330A is in fluid communication with the reducer 310A via a conduit 335A and the conduit 305A. The other outlet 334A is in fluid communication with the second chemical loop 300B, as described below. In addition, the SPCV 330A includes two air inlet lines 301A and 311A connected thereto. The air inlet line 301A includes a control valve 354A positioned therein. The control valve 354A is in fluid communication with the air supply 302A via a conduit 306A. The air inlet line 311A includes a control valve 352A positioned therein. The control valve 352A is in fluid communication with the air supply 302A via a conduit 306A.

In the second chemical loop 300B, an air supply 302B is shown in fluid communication with an oxidizer 310B, via a conduit 305B. A control valve 350B is positioned in the conduit 305B, downstream of the air supply 302B, for regulating air flow discharged into the conduit 305B. In one embodiment, the conduit 305B is positioned generally below the oxidizer 310B. The oxidizer 310B is in fluid communication with a separator 320B, via a conduit 315B. The separator 320B is in fluid communication with a SPCV 330B, via a conduit 325B. The SPCV 320B includes two outlets, 332B and 334B. The outlet 332B of the SPCV 320B is in fluid communication with the oxidizer 310B via a conduit 335B and the conduit 305B. The other outlet 334B is in fluid communication with the first chemical loop 300A, as described below. In addition, the SPCV 330B includes two air inlet lines 301B and 311B connected thereto. The air inlet line 301B includes a control valve 354B positioned therein. The control valve 354B is in fluid communication with the air supply 302B via a conduit 306B. The air inlet line 311B includes a control valve 352B positioned therein. The control valve 352B is in fluid communication with the air supply 302B via a conduit 306B.

Figure 2:
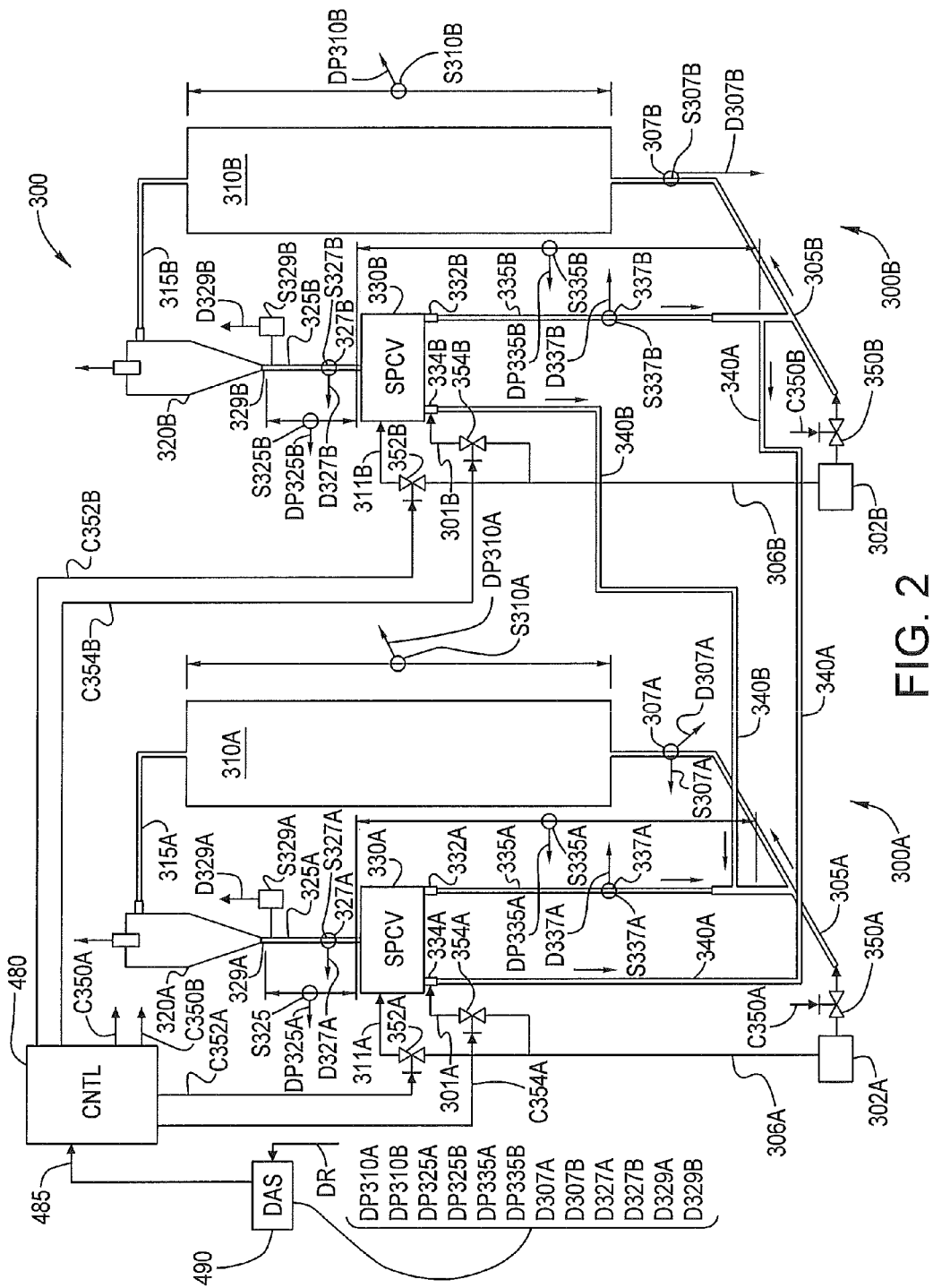
FIG. 2 is a simplified block diagram of an inter-connected multi-loop CL system of a power generation plant.

Still referring to FIG. 2, the outlet 334A of the SPCV 330A is shown in fluid communication with the oxidizer 310B, via conduit 340A. In addition, the outlet 334B of the SPCV 330B is shown in fluid communication with the reducer 310A, via conduit 340B.

The CL system 300 includes a plurality of sensors positioned throughout the CL system, each of which generate one or more data signals. The sensors and data signals in the first chemical loop 300A, include but are not limited to: 1) a differential pressure sensor S310A for measuring differential pressure across the reducer 310A and generating data signal DP310A; 2) a differential pressure sensor S325A for measuring differential pressure across the conduit 325A and generating data signal DP325A; 3) a differential pressure sensor S335A for measuring differential pressure across the conduit 335A and generating data signal DP335A; 4) a mass level, mass flow rate and/or air flow rate sensor S337A positioned at a point 337A in the conduit 335A and generating data signal D337A; 5) a mass level, mass flow rate and/or air flow rate sensor S307A positioned at a point 307A in the conduit 305A and generating a data signal D307A; 6) a mass level, mass flow rate and/or air flow rate sensor S327A positioned at and a point 327A in the conduit 325A and generating a data signal D327A; and 7) a mass volume and/or level sensor S329A measured at a point 329A in the conduit 325A and generating a data signal D329A. In one embodiment, the point 329A is above the point 327A.

The sensors and data signals in the second chemical loop 300B, include but are not limited to: 1) a differential pressure sensor S310B for measuring differential pressure across the oxidizer 310B and generating data signal DP310B; 2) a differential pressure sensor S325B for measuring differential pressure across the conduit 325B and generating data signal DP325B; 3) a differential pressure sensor S335B for measuring differential pressure across the conduit 335B and generating data signal DP335B; 4) a mass level, mass flow rate and/or air flow rate sensor S337B positioned at a point 337B in the conduit 335B and generating data signal D337B; 5) a mass level, mass flow rate and/or air flow rate sensor S307B positioned at a point 307B in the conduit 305B and generating a data signal D307B; 6) a mass level, mass flow rate and/or air flow rate sensor S327B positioned at and a point 327B in the conduit 325B and generating a data signal D327B; and 7) a mass volume and/or level sensor S329B measured at a point 329B in the conduit 325B and generating a data signal D325B. In one embodiment, the point 329B is above the point 327B.

The sensors (S310A, S310B), (S325A, S325B), (S335A, S335B), (S337A, S337B), (S307A, S307B), (S327A, S327B), and (S329A, S329B) are similar to the sensors S120, S190, S205, S207, S152, S192 and S194 described above for the CL system 100, respectively. In addition, the data signals include predetermined data signals DR generated in an external sources (not shown), for example, a computer. The predetermined data signals DR include but are not limited to regulatory controls, load change limitations and/or plant shutdown and start up characteristics. While the mass level, mass flow rate, air flow rate, and mass volume are described and shown as being measured at points 337A, 337B, 335A, 335B, 307A, 307B, 325A and 325B it is contemplated that the mass level, mass flow rate, air flow rate, and mass volume can also be measured at a plurality of points, without departing from the broader aspects disclosed herein.

Referring to FIG. 2, a control system 480 is shown in communication with a data acquisition system (DAS) 490 via a communications link 485. The control system 480 and the DAS 490 are configured similar to the control system 280 and the DAS 290 described above for CL 100. For example, the DAS 490 is in communication with the sensors S337A, S337B, S335A, S335B, S307A, S307B, S325A and S325B and the control system 480 is in communication with control valves 350A, 350B, 352A, 352B, 354A and 354B. The control system transmits control signals C350A, C350B, C352A, C352B, C354A and C354B to the control valves 350A, 350B, 352A, 352B, 354A and 354B, respectively, as described below.

During operation, solids (e.g., Ca and/or CaO) are transported within the chemical loops 300A and 300B referred to herein as "recirculation transport," and between each of the chemical loops 300A and 300B referred to herein as "crossover transport." For example, in the chemical loop 300A a portion of the Ca which exits the reducer 310 through the separator 320A and the SPCV 330A, recirculates back to the reducer 310 via the conduits 335A and 305A. The control valve 350A controls the amount of air introduced into the conduit 305A which controls the amount of solids (e.g., the Ca) provided to the reducer 310A. Similarly, with reference to chemical loop 300B, a portion of CaO which exits the oxidizer 310B through the separator 320B and the SPCV recirculates back to the oxidizer 310B through conduits 335B and 305B. The control valve 350B control the amount of air introduced into the conduit 305B which controls the amount of solids (e.g., the CaO) provided to the oxidizer 310B.

Alternatively, in crossover transport, solids (e.g., Ca and/or CaO) are transported between the chemical loops 300A and 300B. For example, and with reference to the chemical loop 300A, a portion of Ca which exits the reducer 310A through the separator 320A and SPCV 330A is transported to the oxidizer 310B via the conduits 340A and 305B. Similarly, with reference to the chemical loop 300B, a portion of CaO which exits the oxidizer 310B through the separator 320B and SPCV 330B is transported to the reducer 310A via the conduits 340B and 305A.

In the chemical loop 300A, the control valve 354A controls the amount of air introduced into the air supply inlet 301A, which controls the amount of the Ca transported from the SPCV 330A to the oxidizer 310B via the conduit 340A. In the chemical loop 300B, the control valve 354B controls the amount of air introduced into the air supply inlet 301B, which controls the amount of the CaO transported from the SPCV 330B to the reducer 310B via the conduit 340B.

The control system 480 provides control signals C350A, C350B, C352A, C352B, C354A and C354B to the control valves 350A, 350B, 352A, 352B, 354A and 354B, based on the an analysis of the data signals DP310A, DP325A, DP335A, D337A, D307A, D327A, D329A, DP310B, DP325B, DP335B, D337B, D307B, D327B and D325B.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for controlling and optimizing a chemical loop having an oxidizer, a reducer and a separator, the oxidizer being effective to oxidize reduced solids and transport the oxidized solids to the reducer, the reducer being effective to reduce the oxidized solids and transport the reduced solids to the oxidizer, the method comprising:
   oxidizing reduced solids within the oxidizer;
   transporting the oxidized solids to the reducer;
   reducing the oxidized solids within the reducer;
   transporting the reduced solids to the oxidizer;
   measuring at least one parameter in the chemical loop with at least one sensor being in communication with a conduit positioned in the chemical loop; and
   controlling a first valve positioned in the chemical loop in order to regulate a flow of solids through the chemical loop in response to the at least one parameter;
   wherein the conduit is substantially vertical and is disposed in fluid communication with the separator, and the first valve being in fluid communication with the conduit, and the separator being disposed downstream of at least one of the oxidizer and the reducer.

2. The method of claim 1, wherein the at least one parameter is representative of a height of solids in the conduit.

3. The method of claim 1, wherein the at least one parameter is representative of a mass of the solids in the conduit.

4. The method of claim 1, wherein the at least one parameter is representative of a volume of the solids in the conduit.

5. The method of claim 1, wherein the at least one parameter is representative of a differential pressure measured across a portion of the chemical loop.

6. The method of claim 5, wherein the differential pressure is measured across at least one of the oxidizer and the conduit.

7. The method of claim 1, wherein the at least one parameter is representative of a mass flow rate in a portion of the chemical loop.

8. The method of claim 1, wherein the at least one parameter is representative of an air flow rate in a portion of the chemical loop.

9. The method of claim 1, wherein the separator is disposed downstream of the oxidizer; and a second separator is disposed downstream of the reducer; wherein a second conduit is substantially vertical and is disposed in fluid communication with the second separator, and a second valve being in fluid communication with the second conduit; the method further comprising:
   measuring at least a second parameter in the chemical loop with the second sensor; and
   controlling the second valve in order to regulate a flow of solids through the chemical loop in response to the at least second parameter.

10. The method of claim 9, wherein the at least second parameter is representative of a height of solids in the conduit.

11. The method of claim 9, wherein the at least second parameter is representative of a mass of the solids in the conduit.

12. The method of claim 9, wherein the at least second parameter is representative of a volume of the solids in the conduit.

13. The method of claim 9, wherein the at least second parameter is representative of a mass flow rate in a portion of the chemical loop.

14. The method of claim 9, wherein the at least second parameter is representative of an air flow rate in a portion of the chemical loop.

15. The method of claim 9, wherein the at least second parameter is representative of a differential pressure measured across a portion of the chemical loop.

16. The method of claim 15, wherein the differential pressure is measured across at least one of the oxidizer and the conduit.

17. The method of claim 15, wherein the differential pressure is measured across at least one of the reducer and the second conduit.

* * * * *